US012688475B2

(12) United States Patent
Shao et al.

(10) Patent No.: US 12,688,475 B2
(45) Date of Patent: Jul. 21, 2026

(54) METHODS AND INTERNET OF THINGS (IoT) SYSTEMS FOR MANAGEMENT AND CONTROL OF PIPELINE CORRIDOR EMERGENCY MATERIALS BASED ON SMART GAS SUPERVISION

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Siwei Zeng, Chengdu (CN); Lei Zhang, Chengdu (CN); Lei He, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 212 days.

(21) Appl. No.: 18/766,609

(22) Filed: Jul. 8, 2024

(65) Prior Publication Data

US 2024/0362565 A1     Oct. 31, 2024

(30) Foreign Application Priority Data

Jul. 1, 2024    (CN) .......................... 202410870526.9

(51) Int. Cl.
*G06Q 10/00* (2026.01)
*G06Q 10/0635* (2023.01)
(Continued)

(52) U.S. Cl.
CPC .......... *G06Q 10/0635* (2013.01); *G16Y 10/35* (2020.01); *G16Y 20/10* (2020.01);
(Continued)

(58) Field of Classification Search
None
See application file for complete search history.

(56) References Cited

U.S. PATENT DOCUMENTS

2002/0174895 A1* 11/2002 Hill .......................... B65G 5/00
                                                  137/236.1
2005/0027571 A1*  2/2005 Gamarnik .............. G06Q 40/08
                                                  705/4
(Continued)

FOREIGN PATENT DOCUMENTS

CN        108830462 A      11/2018
CN        209082562 U       7/2019
CN        110158648 A       8/2019

OTHER PUBLICATIONS

R Cooper, J Barnett et al. (Pipelines for transporting CO2 in the UK) Energy Procedia, 2014—ScienceDirect, Elsevier (Year: 2014).*
(Continued)

*Primary Examiner* — Hafiz A Kassim
(74) *Attorney, Agent, or Firm* — METIS IP LLC

(57) ABSTRACT

Disclosed is a method and an Internet of Things (IoT) system for management and control of pipeline corridor emergency materials based on smart gas supervision. The IoT system comprises a smart gas company management platform, a gas equipment object platform, and a government gas supervision management platform. The smart gas company management platform is configured to: obtain at least one of operation and maintenance data, geographic information, and operation filing data of a pipeline corridor; obtain pipeline corridor monitoring data and gas monitoring data of the pipeline corridor through the gas equipment object platform; obtain population data and other pipeline data through the government gas supervision management platform; assess risk responsivities of different storage locations; determine adjustment information of the storage locations; and send the adjustment information to the government gas supervision management platform, and in response to determining that the government gas supervision management platform determines to perform adjustment of the
(Continued)

100 storage locations, enable the smart gas company management platform to adjust, based on the adjustment information, parameters of an environmental adjustment device.

19 Claims, 5 Drawing Sheets

(51) Int. Cl.

| | |
|---|---|
| *G16Y 10/35* | (2020.01) |
| *G16Y 20/10* | (2020.01) |
| *G16Y 20/30* | (2020.01) |
| *G16Y 40/10* | (2020.01) |
| *G16Y 40/35* | (2020.01) |

(52) U.S. Cl.
CPC .............. *G16Y 20/30* (2020.01); *G16Y 40/10* (2020.01); *G16Y 40/35* (2020.01)

(56) References Cited

U.S. PATENT DOCUMENTS

| | | | | |
|---|---|---|---|---|
| 2010/0100510 A1* | 4/2010 | Balaban | .................. | G06N 7/08 |
| | | | | 706/14 |
| 2010/0250312 A1* | 9/2010 | Tarabzouni | ........... | G06Q 50/06 |
| | | | | 709/200 |
| 2015/0143806 A1* | 5/2015 | Friesth | ..................... | F03G 7/04 |
| | | | | 220/592.2 |
| 2019/0234786 A1* | 8/2019 | Klicpera | ................ | G01M 3/26 |
| 2022/0146048 A1* | 5/2022 | Ewan | ................... | F17C 11/005 |
| 2023/0167950 A1* | 6/2023 | Shao | ..................... | F17D 5/005 |
| | | | | 137/1 |

OTHER PUBLICATIONS

17. Melaina M et al. (Blending hydrogen into natural gas pipeline networks: a review of key issues) Google Scholar www.osti.gov Published 2013 (Year: 2013).*

\* cited by examiner

<u>100</u>

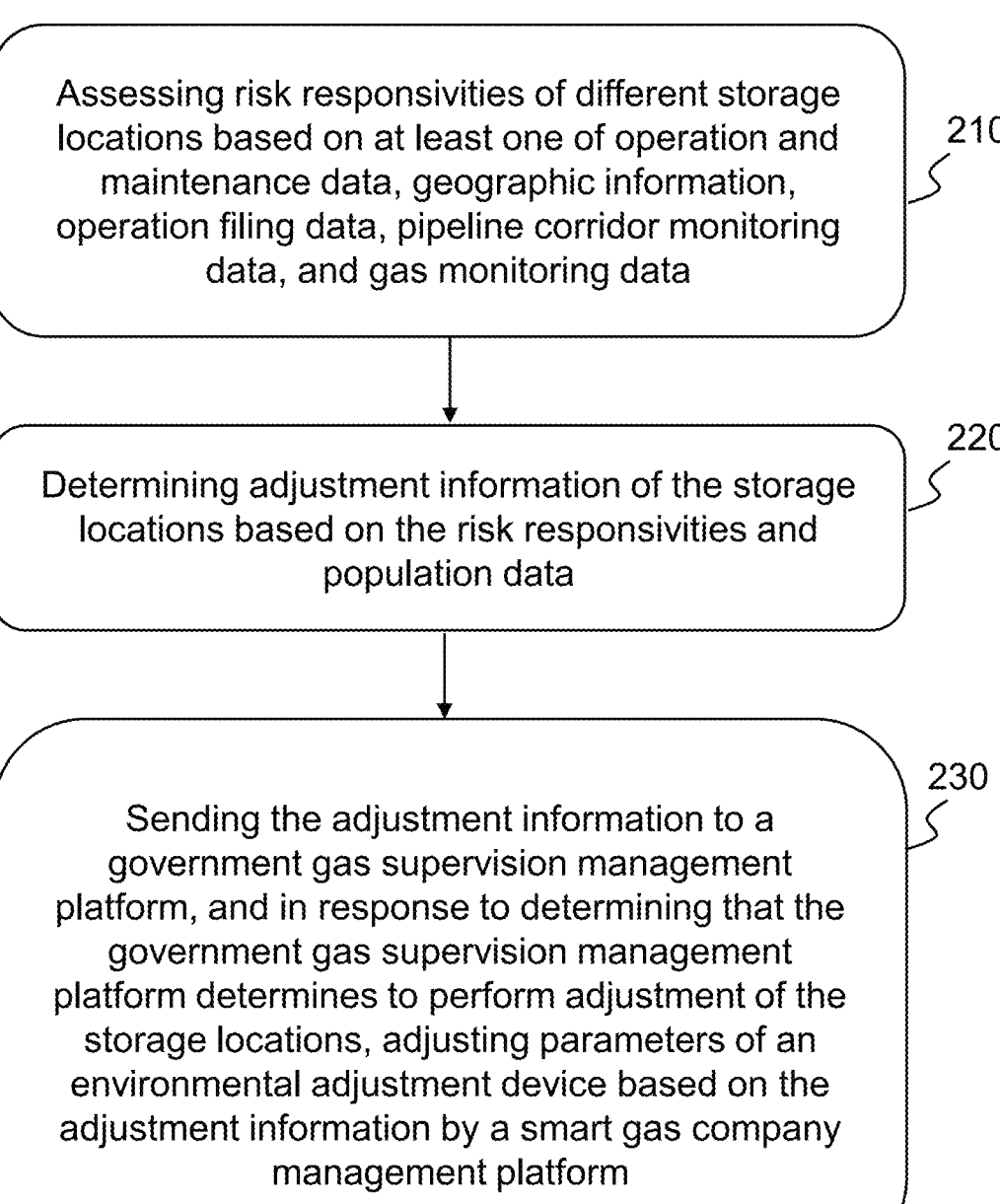

200

Assessing risk responsivities of different storage locations based on at least one of operation and maintenance data, geographic information, operation filing data, pipeline corridor monitoring data, and gas monitoring data — 210

Determining adjustment information of the storage locations based on the risk responsivities and population data — 220

Sending the adjustment information to a government gas supervision management platform, and in response to determining that the government gas supervision management platform determines to perform adjustment of the storage locations, adjusting parameters of an environmental adjustment device based on the adjustment information by a smart gas company management platform — 230

METHODS AND INTERNET OF THINGS (IoT) SYSTEMS FOR MANAGEMENT AND CONTROL OF PIPELINE CORRIDOR EMERGENCY MATERIALS BASED ON SMART GAS SUPERVISION

CROSS-REFERENCES TO RELATED APPLICATIONS

This application claims priority of Chinese Patent Application No. 202410870526.9, filed on Jul. 1, 2024, the content of which is entirely incorporated herein by reference.

TECHNICAL FIELD

The present disclosure relates to the technical field of management and control of gas pipeline corridors, and in particular to a method and an Internet of Things (IoT) system for management and control of pipeline corridor emergency materials based on smart gas supervision.

BACKGROUND

A gas pipeline corridor is a system of passages dedicated to the accommodation and maintenance of urban gas pipelines. In order to ensure the normal operation of the gas pipeline corridor, it is necessary to equip the pipeline corridor with various materials, such as maintenance materials, emergency materials, and fire materials. The materials are huge in quantity, and are stored in various regions of the pipeline corridor. If the materials are not planned and managed, it is easy to lead to confusion in the management of the pipeline corridor. In addition, in some urban planning, the gas pipeline corridor is also integrated into the urban pipeline corridor system with other pipelines such as electric power, communication, or the like, to implement unified construction, which also leads to various pipelines within the pipeline corridor intertwined, exacerbating confusion in the management of the pipeline corridor.

In order to solve the problem of confusion in the management of the pipeline corridor, CN110158648A provides a system for operation and maintenance monitoring and management of an urban underground integrated pipeline corridor, which realizes monitoring and management through interactive information exchange between a pipeline corridor supervision platform and sub-control centers, and realizes the supervision function of comprehensive control by integrating alarms, pipeline corridor monitoring, accident operation and maintenance management, supervision and assessment, command, and other functions. CN110158648A improves the problem of confusion in the pipeline corridor, but does not address the supervision of materials in the pipeline corridor.

Therefore, it is desirable to provide a method and an IoT system for management and control of pipeline corridor emergency materials based on smart gas supervision, to better manage the gas pipeline corridor in an integrated way.

SUMMARY

One or more embodiments of the present disclosure provide an Internet of Things (IoT) system for management and control of pipeline corridor emergency materials based on smart gas supervision. The IoT system may comprise a smart gas company management platform, a gas equipment object platform, and a government gas supervision management platform. The smart gas company management platform may be configured to: obtain, based on a data storage center, at least one of operation and maintenance data, geographic information, and operation filing data of a pipeline corridor, the operation filing data including storage locations of the pipeline corridor emergency materials; obtain pipeline corridor monitoring data and gas monitoring data of the pipeline corridor through the gas equipment object platform; obtain population data and other pipeline data through the government gas supervision management platform; assess, based on at least one of the operation and maintenance data, the geographic information, the operation filing data, the pipeline corridor monitoring data, and the gas monitoring data, risk responsivities of different storage locations; determine, based on the risk responsivities and the population data, adjustment information of the storage locations; and send the adjustment information to the government gas supervision management platform, and in response to determining that the government gas supervision management platform determines to adjust the storage locations, adjust, based on the adjustment information, parameters of an environmental adjustment device.

One or more embodiments of the present disclosure provide a method for management and control of pipeline corridor emergency materials based on smart gas supervision, implemented by a smart gas company management platform of an Internet of Things (IoT) system for management and control of pipeline corridor emergency materials based on smart gas supervision. The method may comprise obtaining, based on a data storage center, at least one of operation and maintenance data, geographic information, and operation filing data of a pipeline corridor, the operation filing data including storage locations of the pipeline corridor emergency materials; obtaining pipeline corridor monitoring data and gas monitoring data of the pipeline corridor through a gas equipment object platform; obtaining population data and other pipeline data through a government gas supervision management platform; assessing, based on at least one of the operation and maintenance data, the geographic information, the operation filing data, the pipeline corridor monitoring data, and the gas monitoring data, risk responsivities of different storage locations; determining, based on the risk responsivities and the population data, adjustment information of the storage locations; and sending the adjustment information to the government gas supervision management platform, and in response to determining that the government gas supervision management platform determines to adjust the storage locations, causing the smart gas company management platform to adjust, based on the adjustment information, parameters of an environmental adjustment device.

One or more embodiments of the present disclosure provide a non-transitory computer-readable storage medium comprising computer instructions that, when read by a computer, may direct the computer to implement the method for management and control of the pipeline corridor emergency materials based on smart gas supervision.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein:

FIG. 2 is flowchart illustrating an exemplary method for management and control of pipeline corridor emergency materials based on smart gas supervision according to some embodiments of the present disclosure;

DETAILED DESCRIPTION

Figure 1:
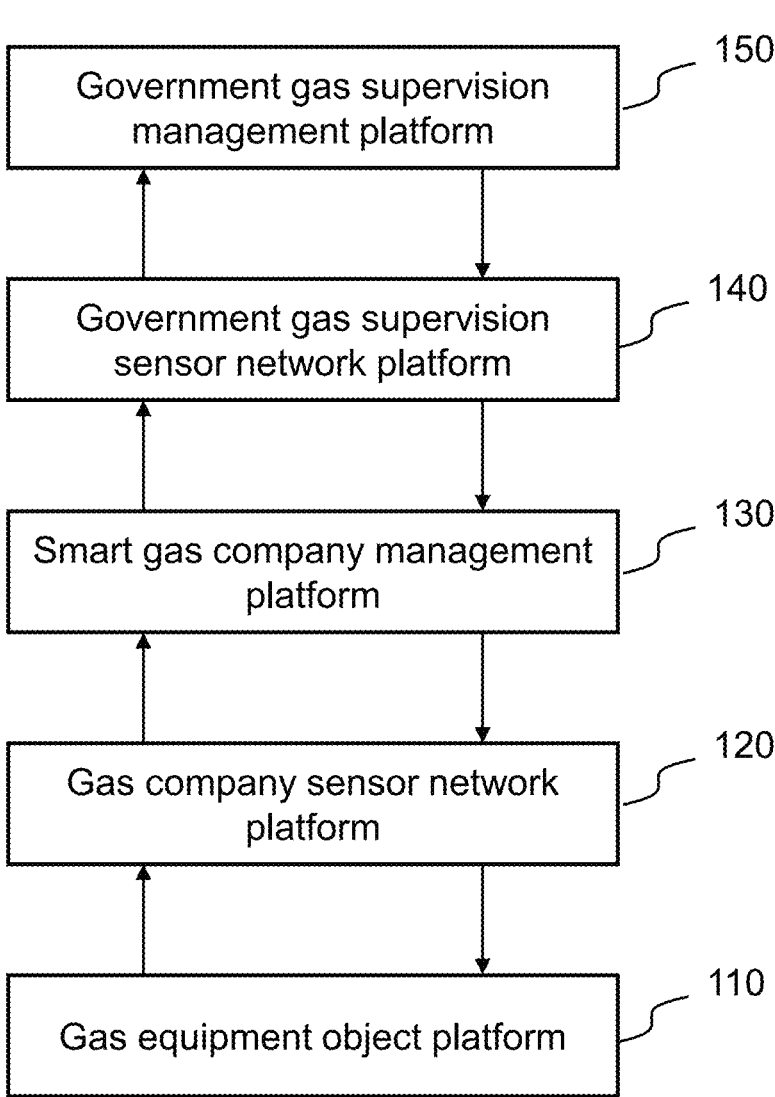
FIG. 1 is a structural diagram illustrating a platform of an exemplary Internet of Things (IoT) system for management and control of pipeline corridor emergency materials based on smart gas supervision according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person having ordinary skills in the art to apply the present disclosure to other similar scenarios in accordance with these drawings without creative labor. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

CN110158648A provides a system for operation and maintenance monitoring and management of an urban underground integrated pipeline corridor, which supervises operation and maintenance of each of sub-control centers through a supervision platform, and performs interactive information exchange with each of the sub-control centers, thereby realizing monitoring and management of the integrated pipeline corridor. If the urban pipeline corridor is supervised using the supervision system disclosed CN110158648A, confusion in the management of the gas pipeline corridor can be improved. However, the issue of material storage inside the pipeline corridor is not addressed. Therefore, the method for management of the gas pipeline corridor needs to be improved. The embodiments of the present disclosure provide an IoT system for management and control of pipeline corridor emergency materials based on smart gas supervision, which dynamically plans the emergency materials in the gas pipeline corridor using a smart gas company management platform based on pipeline corridor operation and maintenance data, gas monitoring data, geographic information of the pipeline corridor, etc., thereby improving the safety and efficiency of the gas pipeline corridor.

FIG. 1 is a structural diagram illustrating a platform of an exemplary Internet of Things (IoT) system for management and control of pipeline corridor emergency materials based on smart gas supervision according to some embodiments of the present disclosure.

As shown in FIG. 1, an IoT system 100 for management and control of pipeline corridor emergency materials based on smart gas supervision may include a gas equipment object platform 110, a gas company sensor network platform 120, a smart gas company management platform 130, a government gas supervision sensor network platform 140, and a government gas supervision management platform 150.

The gas equipment object platform 110 refers to a functional platform for perceptual information generation and control information execution.

In some embodiments, the gas equipment object platform 110 may be configured as a pipeline corridor monitoring device and a gas monitoring device. In some embodiments, the gas equipment object platform 110 may also be configured as an environmental adjustment device and a material transportation device.

The pipeline corridor monitoring device may include a temperature sensor, an air sensor, and a surveillance camera device. In some embodiments, the pipeline corridor monitoring device may be deployed within a pipeline corridor and configured to acquire pipeline corridor monitoring data within the pipeline corridor and upload the pipeline corridor monitoring data to the gas company sensor network platform 120 through the gas equipment object platform 110.

The gas monitoring device may include a flow rate monitoring device, a temperature sensor, and a pressure sensor. In some embodiments, the gas monitoring device may be deployed within a gas pipeline and configured to acquire gas monitoring data within the gas pipeline and upload the gas monitoring data to the gas company sensor network platform 120 through the gas equipment object platform 110. In some embodiments, the gas equipment object platform 110 may interact with the smart gas company management platform 130. For example, the gas equipment object platform 110 may send the gas monitoring data within the pipeline corridor to the smart gas company management platform 130.

The material transportation device refers to a device for transporting the emergency materials. For example, the transportation device may be an automated guided vehicle (AGV) with a robotic arm. In some embodiments, the material transportation device may be configured to perform material transportation within the pipeline corridor according to a transportation instruction.

The environmental adjustment device refers to a device for controlling an environment of the pipeline corridor. The environmental adjustment device may include a fan and a dehumidification device. In some embodiments, the environmental adjustment device may be deployed within the pipeline corridor and configured to control the environment within the pipeline corridor by adjusting parameters of the environmental adjustment device.

The gas company sensor network platform 120 refers to a platform for perceptual information sensing communication and control information sensing communication. In some embodiments, the gas company sensor network platform 120 may be configured to connect the smart gas company management platform 130 and the gas equipment object platform 110.

The smart gas company management platform 130 refers to a platform for management information generation and control information execution.

In some embodiments, a processor may be configured to determine the transportation instruction based on the adjustment information; and control, based on the transportation instruction, the material transportation device to transport the materials within the pipeline corridor. The transportation instruction may include a transportation route.

In some embodiments, the processor may be configured to upload a current material storage situation to the government gas supervision management platform 150 through the smart gas company management platform 130 after the material transportation device is controlled to complete material transportation.

The smart gas company management platform 130 may include a data storage center. The data storage center refers to a platform for storing and managing information on the operation of pipeline corridor equipment.

The government gas supervision sensor network platform 140 refers to a platform for perceptual information sensing communication and control information sensing communication. In some embodiments, the government gas supervision sensor network platform 140 may be configured to connect the smart gas company management platform 130 and the government gas supervision management platform 150.

The government gas supervision management platform 150 refers to an integrated management platform for government management of gas. In some embodiments, the government gas supervision management platform 150 may be configured to supervise data such as population data, pipeline data, or the like, around the pipeline corridor.

In some embodiments, the government gas supervision management platform 150 may interact with the smart gas company management platform 130. For example, the government gas supervision management platform 150 may send the population data and the pipeline data to the smart gas company management platform 130.

In some embodiments, the smart gas company management platform 130 may store operation and maintenance data, geographic information, and operation filing data of the pipeline corridor in the data storage center, and may read the operation and maintenance data, the geographic information, and the operation filing data from the data storage center.

The smart gas company management platform 130 may obtain pipeline corridor monitoring data and gas monitoring data from the gas equipment object platform 110.

In some embodiments, the smart gas company management platform 130 may obtain the population data and other pipeline data from the government gas supervision management platform 150, and may also send the adjustment information to the government gas supervision management platform 150.

In some embodiments, the IoT system for management and control of the pipeline corridor emergency materials based on smart gas supervision may also include a multilevel network, such as a primary network, a secondary network, or the like. For example, the primary network may include a smart gas primary network management platform, a smart gas primary network sensor network platform, and a gas primary network object platform. As another example, the secondary network may include a smart gas secondary network management platform, a smart gas secondary network sensor network platform, and a gas secondary network object platform.

In some embodiments of the present disclosure, the smart gas company management platform 130 may obtain multi-dimensional data from other platforms, which improves the assessment accuracy of the state of the pipeline corridor, enabling the pipeline corridor to make more accurate adjustment to the storage of the materials in the event of emergency. In addition, the IoT system may integrate multiple platforms such as the smart gas company management platform 130, the gas equipment object platform 110, and the government gas supervision management platform 150, and may form a closed loop of information operation between the platforms with effective synergistic operation, which helps to enhance the informationization and intelligence of management and control of the emergency materials in the gas pipeline corridor. In general, the system may improve the emergency response capability, safety, and management efficiency of the pipeline corridor through intelligent data management and collaborative decision-making.

FIG. 2 is flowchart illustrating an exemplary method for management and control of pipeline corridor emergency materials based on smart gas supervision according to some embodiments of the present disclosure.

As shown in FIG. 2, a process 200 may include the following operations. In some embodiments, the process 200 may be performed by a smart gas company management platform.

In 210, risk responsivities of different storage locations may be assessed based on at least one of operation and maintenance data, geographic information, operation filing data, pipeline corridor monitoring data, and gas monitoring data.

The risk responsivities may reflect the abilities of the storage locations to transport emergency materials to fault locations. In some embodiments, the risk responsivities may be expressed by a score, such as 0-100.

The operation and maintenance data refers to data related to operation and maintenance of a pipeline corridor system. In some embodiments, the operation and maintenance data may include recorded data on a fault, inspection, maintenance, and other work that occurs after a pipeline corridor is put into use.

The geographic information refers to structural data related to a location of the pipeline corridor and construction of the pipeline corridor. In some embodiments, the geographic information may include the geographic location of the pipeline corridor, structural data of the pipeline corridor, and one or more candidate storage locations of the pipeline corridor.

The geographic location of the pipeline corridor refers to a specific location where the pipeline corridor is located. In some embodiments, the geographic location of the pipeline corridor may be represented by coordinates.

The structural data of the pipeline corridor refers to data related to a structure of the pipeline corridor. In some embodiments, the structural data may include information such as a dimension of the pipeline corridor and a burial depth of the pipeline corridor. The structural data of the pipeline corridor may be represented by a three-dimensional model.

The one or more candidate storage locations refer to one or more alternative storage locations to be determined as storage locations. More descriptions regarding the storage locations may be found in the related descriptions below.

The operation filing data refers to filing data related to material storage in the pipeline corridor. In some embodiments, the operation filing data may include data related to current storage locations of emergency materials in the pipeline corridor. The composition of the operation filing data may be similar to that of a material storage situation. More descriptions regarding the material storage situation may be found in FIG. 2 and related descriptions thereof.

The pipeline corridor monitoring data may reflect an environmental change within the pipeline corridor and an operation situation of equipment related to the pipeline corridor. In some embodiments, the pipeline corridor monitoring data may include temperature data, humidity data, pipeline corridor ventilation data, pipeline corridor cleanliness data, etc.

The gas monitoring data refers to data generated by monitoring gas in the pipeline corridor. The gas monitoring data may reflect whether there is gas leakage in the pipeline corridor, and reflect parameters related to the gas in the pipeline. In some embodiments, the gas monitoring data may include pipeline gas pressure, a pipeline gas flow rate, gas concentration in the pipeline corridor, a gas leakage rate, or the like.

In some embodiments, the smart gas company management platform may construct a vector to be matched based on the operation and maintenance data, the geographic information, the operation filing data, the pipeline corridor monitoring data, and the gas monitoring data. The smart gas company management platform may obtain reference vectors of which vector distances from the vector to be matched are less than a distance threshold by searching in a vector database based on the vector to be matched. The vector database may be configured to store a plurality of reference vectors and historical risk responsivities corresponding to plurality of reference vectors. The smart gas company management platform may determine the historical risk responsivities corresponding to the plurality of reference vectors as current required risk responsivities. The historical risk responsivities may be obtained based on actual experience and historical data. The plurality of reference vectors may be constructed based on historical operation and maintenance data, historical geographic information, historical operation filing data, historical pipeline corridor monitoring data, and historical gas monitoring data.

In some embodiments, the smart gas company management platform may also determine risk responsivities of different storage locations based on a formula. More descriptions may be found in FIG. 3 and related descriptions thereof.

More descriptions regarding the geographic information, the pipeline corridor monitoring data, the gas monitoring data, and the risk responsivities may be found in FIG. 2 and related descriptions thereof.

In 220, adjustment information of the storage locations may be determined based on the risk responsivities and population data.

The population data refers to data related to a population residing in the vicinity of a pipeline corridor region. In some embodiments, the population data may include a count of people, a population density, etc.

The storage locations refer to locations for storing pipeline corridor emergency materials. In some embodiments, the storage locations may include static locations and dynamic locations. The static locations refer to relatively constant and fixed storage locations. The dynamic locations refer to storage locations that need to be dynamically adjusted based on an actual situation. For example, a maintenance tool required for an emergency generator, or the like, may be located at the static locations for timely access when the generator is damaged. A fire extinguisher for fire prevention and flood control and a water expanding bag may be dynamically adjusted based on the operation and maintenance data to ensure the full use of the emergency materials.

The adjustment information refers to data related to material adjustment. In some embodiments, the adjustment information may include information of materials that need to be adjusted, and information of a target location at which the materials are adjusted. The information of the materials refers to data and features reflecting a storage situation of the materials. The information of the materials may include a type, a quantity, a volume, and a weight of the materials. The information of the target location may include coordinates of the target location, a direction and a distance of the target location from a current location, etc. As an example, the adjustment information may be that three bottles of fire extinguishers may be transported from a storage point A to a storage point B one kilometer in a pipeline direction.

In some embodiments, the smart gas company management platform may determine the adjustment information of the storage locations in various ways. For example, the smart gas company management platform may determine the adjustment information of the storage locations by querying a preset table of the adjustment information based on the risk responsivities and the population data. The preset table of the adjustment information may include different historical risk responsivities, historical population data, and a plurality of corresponding adjustment information. In some embodiments, the preset table of the adjustment information may be preset based on the historical data or prior knowledge.

In some embodiments, the smart gas company management platform may also generate the adjustment information based on candidate risk responsivities. More descriptions may be found in FIG. 5 and related instructions thereof.

More descriptions regarding the storage locations and the adjustment information may be found below.

In 230, the adjustment information may be sent to a government gas supervision management platform, and in response to determining that the government gas supervision management platform determines to perform adjustment of the storage locations, parameters of an environmental adjustment device may be adjusted based on the adjustment information by a smart gas company management platform.

The parameters of the environmental adjustment device refer to control parameters for regulating operation of the environmental adjustment device. In some embodiments, different environmental adjustment devices may have different parameters. For example, parameters of a fan may include a rotation speed and an air flow rate. Parameters of a dehumidification device may include dehumidification power, target air humidity, etc.

Adjustment of the storage locations refers to a process in which the government gas supervision management platform determines whether material adjustment is required, and thus generates an adjustment instruction corresponding to the adjustment information. After the government gas supervision management platform receives the adjustment information, the government gas supervision management platform may determine to perform adjustment of the storage locations or not.

In some embodiments, the smart gas company management platform may determine the parameters of the environmental adjustment device in various ways. For example, the smart gas company management platform may determine, based on the adjustment information, changes in materials at the different storage locations. For storage locations with increased materials, the air circulation may become worse, and in order to prevent moisture buildup, the rotation speed of the fan and dehumidification power may be increased.

In some embodiments, a correspondence relationship between different types of adjustment information and different parameters of the environmental adjustment device may be preset based on the historical data or prior knowledge. Correspondingly, the smart gas company management platform may determine the parameters of the environmental adjustment devices based on the adjustment information and the correspondence relationship.

In some embodiments, by assessing the degree of risk and determining the adjustment information, uniform and reasonable distribution of the materials can be ensured, which facilitates subsequent fast and reasonable emergency dispatching; and by adjusting the parameters of the environmental adjustment device based on the adjustment information, the environment in which the materials are stored after adjustment can be improved, which is favorable to the safe storage of the materials.

Figure 3:
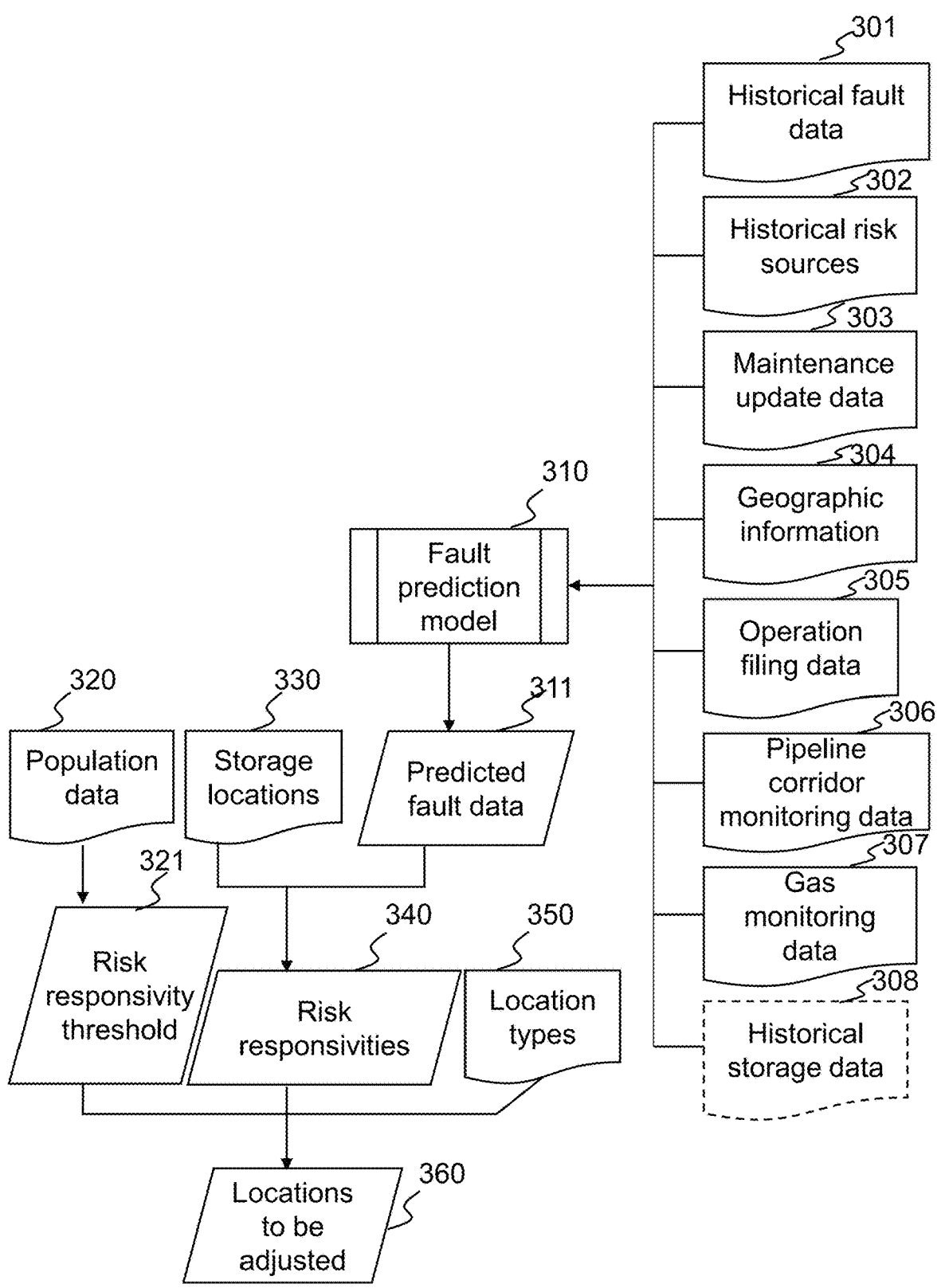
FIG. 3 is a schematic diagram illustrating an exemplary fault prediction model according to some embodiments of the present disclosure.

FIG. 3 a schematic diagram illustrating an exemplary fault prediction model according to some embodiments of the present disclosure. In some embodiments, locations to be adjusted may be determined by the following operations S1-S5.

Operation S1, at least one of historical fault data 301, historical risk sources 302, and maintenance update data 303 may be obtained based on operation and maintenance data.

The historical fault data 301 refers to data related to a fault after a pipeline system is put into service. In some embodiments, the historical fault data 301 may include location information of the fault in a pipeline corridor, start time of the fault, a duration of the fault, and a type of the fault. For example, the type of the fault may include an equipment fault, gas leakage, damage of a gas pipeline, etc.

A risk source refers to a region of the gas pipeline corridor where a safety risk may exist. In some embodiments, when a staff member believes that a certain location in the pipeline corridor has a fault, the location may be reported as the risk source.

The historical risk sources 302 refer to risk sources of historical time points. In some embodiments, the historical fault sources may include location information of a risk region in the pipeline corridor system, start time of a risk, a duration of the risk, and a type of the risk.

The maintenance update data 303 refers to data related to inspection and maintenance made against the historical risk sources 302, and capable of reflecting a maintenance situation in response to a fault. In some embodiments, the maintenance update data 303 may include a list of maintenance personnel, a maintenance location, a maintenance content, a maintenance result, and start and end time of maintenance. The maintenance content refers to a specific operation performed by the maintenance personnel to carry out the maintenance operation, such as inspection or inspection and fault maintenance.

In some embodiments, the processor may obtain the operation and maintenance data of the historical time periods based on the data storage center, take data related to occurred historical faults as the historical fault data 301, take locations of the occurred faults as the historical risk sources 302, and take data related to maintenance uploaded by the maintenance personnel after the inspection and maintenance operation for the historical risk sources 302 is completed as the maintenance update data 303.

In S2, predicted fault data of the pipeline corridor at a future time may be determined through a fault prediction model 310 based on at least one of the historical fault data 301, the historical risk sources 302, the maintenance update data 303, the geographic information 304, the operation filing data 305, the pipeline corridor monitoring data 306, and the gas monitoring data 307.

The predicted fault data 311 refers to data related to a fault at a future time point obtained by prediction. The predicted fault data 311 may include a predicted fault location, a predicted start time of the fault, and a predicted type of the fault (e.g., the equipment fault, the gas leakage, damage to the gas pipeline, etc.). The predicted fault location refers to a location in the pipeline corridor where the fault is likely to occur.

In some embodiments, the fault prediction model may be a machine learning model. In some embodiments, the fault prediction model may be a recurrent neural network (RNN) model.

In some embodiments, an input of the fault prediction model 310 may include the historical fault data 301, the historical risk sources 302, the maintenance update data 303, the geographic information 304, the operation filing data 305, the pipeline corridor monitoring data 306, and the gas monitoring data 307, and an output of the fault prediction model may include the predicted fault data 311.

In some embodiments, the fault prediction model may be obtained by training based on a plurality of first training samples with first labels. The plurality of first training samples with the first labels may be input into an initial fault prediction model. A loss function may be constructed through the first labels and results of the initial fault prediction model. Parameters of the initial fault prediction model may be iteratively updated based on the loss function. The model training may be completed when the loss function of the initial fault prediction model satisfies a preset condition, and a trained fault prediction model may be obtained. The preset condition may be that the loss function converges, a count of iterations reaches a threshold, etc.

In some embodiments, the first training samples may include sample historical fault data, sample historical risk sources, sample maintenance update data, sample geographic information, sample operation filing data, sample pipeline corridor monitoring data, and sample gas monitoring data of a first time point. In some embodiments, the first labels may include actual fault data of a pipeline corridor segment at a second time point. The first time point may be earlier than the second time point.

In some embodiments, the input to the fault prediction model may further include historical storage data 308. When the fault prediction model is trained, the first training samples may further include the historical storage data 308 at the first time point.

In some embodiments of the present disclosure, due to long-time storage of the materials in the pipeline corridor, the air flow in the pipeline corridor may be affected or may lead to frequent static electricity, which may have certain impacts on the pipelines in a current region. By inputting the historical storage data 308 into the model, the impacts of the materials stored in the pipeline corridor can be comprehensively considered through the model, thereby making the obtained predicted fault data 311 more realistic and accurate, and improving the accuracy and reliability of the predicted results.

In S3, risk responsivities may be determined based on the predicted fault data and the storage locations 330.

In some embodiments, the static locations may be further divided into first static locations and second static locations. In response to determining that a second consecutive preset number of times of risk responsivities of the second static locations is less than a second threshold, the second static locations may be converted into the dynamic locations. In response to determining that a first consecutive preset number of times of risk responsivities of the dynamic locations is greater than a first threshold, the dynamic locations may be converted into the second static locations; and the second static locations of which the risk responsivities are less than a third threshold in the previous round may be taken as the dynamic locations of a current round. The first and second consecutive preset number of times may be related to the historical risk responsivities and the location types of the storage locations.

The first static locations refer to storage locations that remain constant for a long period of time except in special cases. In some embodiments, if storage locations are of great significance or valuable equipment exists in the vicinity, and long-term storage of certain necessary emergency materials is required, the storage locations may be determined as the first static locations. For example, a fire extinguisher, a spare part, a maintenance tool, etc., may be stored at the first static locations near the valuable equipment, and an accident may be handled promptly when the accident occurs, thereby reducing potential safety risks.

The second static locations refer to relatively static storage locations where the stored materials are not changed temporarily. In some embodiments, if the storage locations are not significant and there is no valuable equipment in the vicinity, the storage locations may be determined as the second static locations due to no necessary emergency materials to be stored, such as a water expanding bag stored near a drying duct.

In some embodiments, the second static locations may be converted into the dynamic locations if the second consecutive preset number of times of the risk responsivities of the second static locations is less than the second threshold.

The second consecutive preset number of times refers to a determination parameter for converting the second static locations into the dynamic locations. If the number of times that the risk responsivities of the second static locations are less than second threshold reaches the second consecutive preset number of times, the second static locations may be converted into the dynamic locations. For example, if the second consecutive preset number of times is 3, and the risk responsivities of the second static locations are less the second threshold value for three consecutive times, the second static locations may be converted into the dynamic locations.

In some embodiments, the processor may determine the second consecutive preset number of times by querying a first preset table based on a location type and historical risk responsivities corresponding to the second static location. The first predetermined table may include a preset correspondence relationship between the location types, the historical risk responsivities, or the like, of various values and the second consecutive preset number of times. The first preset table may be constructed based on the historical data or the priori experience.

The location types refer to types of the storage locations. In some embodiments, the storage locations may include the static locations (e.g., the first static locations and the second static locations) and the dynamic locations.

In some embodiments, the risk responsivity may be negatively correlated with a path distance between the storage location and the predicted fault location. For example, the shorter the distance between current storage locations and the predicted failure location, the greater the ability to transport the emergency materials from the current storage locations to the fault location when a fault occurs, and the greater the corresponding value of the risk responsivity.

In some embodiments, the processor may determine the risk responsivity based on the formula (1):

$$F = \frac{a \times W \times N}{L} \tag{1}$$

Wherein F denotes the risk responsivity; a denotes a coefficient; W denotes a total count of emergency materials at the storage location; N denotes a count of types of the emergency materials; and L denotes the path distance between the storage location and the predicted fault location. The greater the number and variety of the emergency materials at the storage location, and the shorter the path distance between the storage location and the predicted fault location, the shorter the actual distance for the maintenance personnel to reach the fault location, the greater the response to the fault, and the greater the value of the risk responsivity. The path distance may be obtained based on the geographic information through a path navigation algorithm. A specific value of the coefficient a may be preset based on the priori experience.

In some embodiments, the processor may also determine the risk responsivities corresponding to the storage locations through a responsivity determination model. More descriptions regarding the responsivity determination model may be found in FIG. 4 and related descriptions thereof.

The third threshold refers to a threshold for determining whether the second static locations need to be immediately converted into the dynamic locations. The second static locations may be immediately converted into the dynamic locations if the risk responsivities of the second static locations are less than third threshold.

The first consecutive preset number of times refers to a determination parameter for converting the dynamic locations into the second static locations. The dynamic locations may be converted into the second static locations if the number of times that the dynamic locations are greater the first threshold reaches the second consecutive preset number of times.

In some embodiments, the first threshold, the second threshold, and the third threshold may be obtained by manual presetting. The first threshold may be greater than the second threshold, and the second threshold may be greater than the third threshold.

In some embodiments of the present disclosure, by dividing the static locations into the first static locations and the second static locations interconvertible with the dynamic locations, and controlling interconversion based on the threshold and the preset numbers of times, the stability of the material storage can be considered, and transportation of some of the stored materials can be adjusted, increasing the flexibility of the material storage, and making the final situation of the material storage more in line with the actual situation.

In S4, a risk responsivity threshold 321 may be determined based on the population data 320.

The risk responsivity threshold 321 refers to a critical condition for determining that the emergency materials stored at the dynamic locations require transportation. In some embodiments, the risk responsivity threshold 321 may be negatively correlated with the number of people and the population density. For example, the higher the number of people near the storage location and the higher the population density, more people may be affected when a pipeline fault occurs, and thus frequent adjustment to the storage of the emergency materials is required to ensure that the fault is timely resolved. Accordingly, the risk responsivity threshold 321 may be smaller.

In some embodiments, the processor may determine the risk responsivity threshold 321 by querying a second preset table based on the number of people and the population density. The second preset table may include a preset correspondence relationship between the number of people and the population density, etc., of various values and the risk responsivity threshold 321. The second preset table may be constructed based on the historical data.

In S5, locations to be adjusted 360 may be determined based on at least one of risk responsivities 340, the risk responsivity threshold 321, and location types 350 of the storage locations.

The locations to be adjusted refers to dynamic locations that need to perform adjustment to material transportation.

In some embodiments, the processor may determine the locations to be adjusted by querying a third preset table based on the risk responsivities, the risk responsivity threshold 321, and the location types. The third preset table may include a correspondence relationship between the risk responsivities, the risk responsivity threshold 321, and the location types, etc., of various values and the locations to be adjusted. The third preset table may be constructed based on the historical data.

In some embodiments, the processor may determine dynamic locations of which the risk responsivities are less than the risk responsivity threshold 321 as the locations to be adjusted.

In some embodiments of the present disclosure, by determining the predicted fault data using the fault prediction model and calculating the risk responsivities of different storage locations, and by adjusting the materials of the storage locations of which the risk responsivities are less than the threshold, it ensures that different storage locations have a certain emergency response capability in the face of risk, thereby reducing the situation that the storage locations are too far away from the risk region, and improving the utilization rate of the materials.

Figure 4:
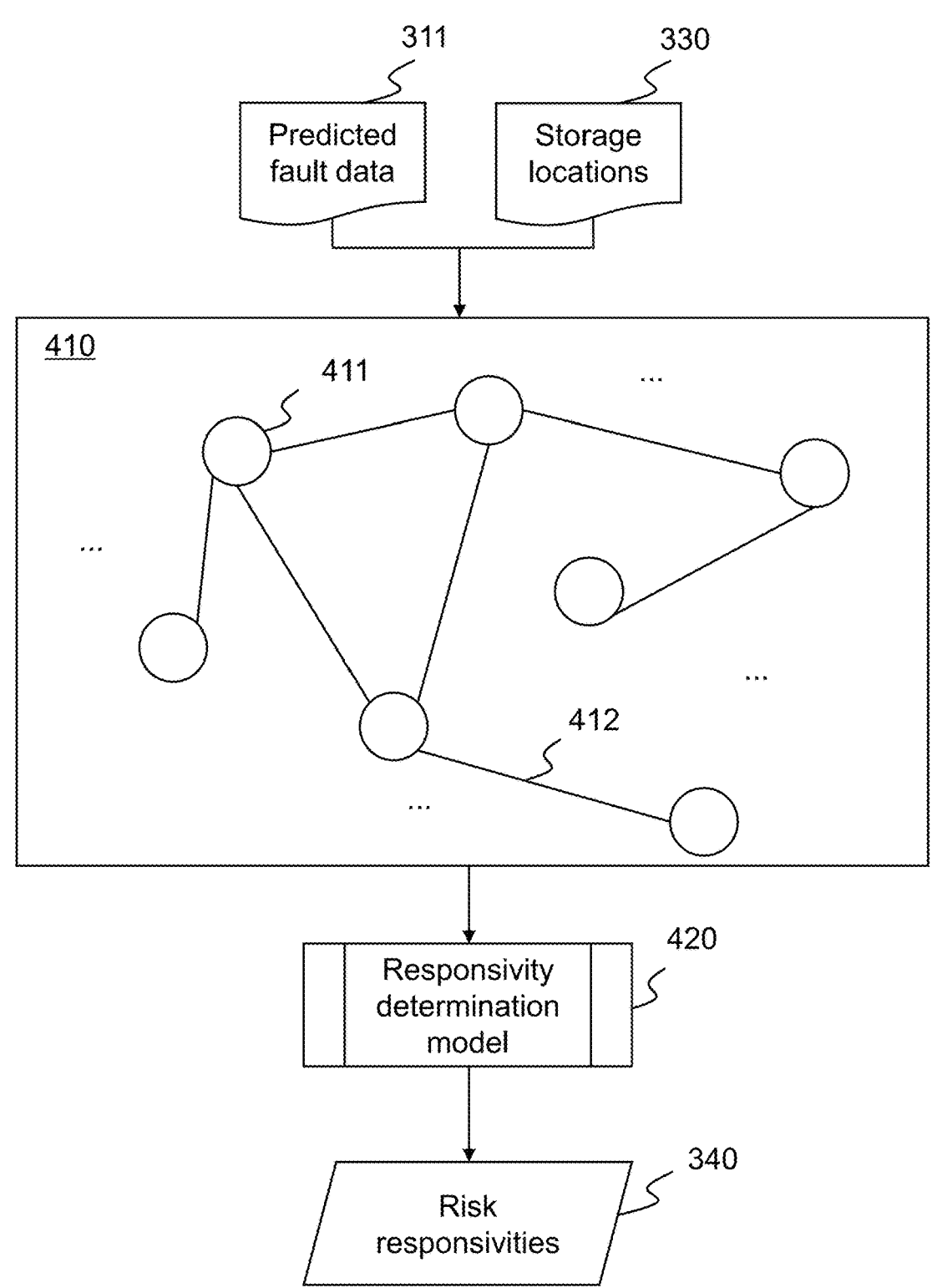
FIG. 4 is a schematic diagram illustrating an exemplary responsivity determination model according to some embodiments of the present disclosure.

FIG. 4 is a schematic diagram illustrating an exemplary responsivity determination model according to some embodiments of the present disclosure.

In some embodiments, a processor may construct, based on the predicted fault data 311, the storage locations 330, and materiel information of the storage locations, a pipeline corridor structural graph 410; and determine, based on the pipeline corridor structural graph 410, the risk responsivities 340 of storage location nodes through a responsivity determination model 420.

The pipeline corridor structural graph 410 refers to a knowledge graph that represents a structure of a pipeline corridor. The pipeline corridor structural graph may characterize distribution features of the storage locations in the pipeline corridor.

The pipeline corridor structural graph 410 may include at least one node 411 and at least one edge 412. The at least one node may include node attributes corresponding to the at least one node. In some embodiments, the at least one node 411 may include a storage location node. Node attributes of the storage location node may include a location type and a current material storage situation.

In some embodiments, the at least one node 411 of the pipeline corridor structural graph 410 may further include a predicted fault location node and an entrance/exit node. In some embodiments, node attributes of the predicted fault location node may include a fault type, fault time, etc. Node attributes of the entrance/exit node may include a geographic location of an entrance/exit, etc.

In some embodiments, the at least one edge 412 may correspond to a pipeline corridor between the at least one node. Attributes of the at least one edge may include operation and maintenance data, pipeline distribution data, a pipeline length, a pipeline width, pipeline corridor monitoring data, etc. A distance between two nodes of the at least one node in the pipeline corridor structural graph may reflect a path distance between the two nodes. If the two nodes are connected by a pipeline corridor, the two nodes may be connected by the at least one edge. The processor may obtain the attributes of the at least one edge based on historical storage data.

In some embodiments of the present disclosure, by analyzing and processing operation and maintenance data, the pipeline distribution data, the pipeline corridor monitoring data, or the like, within the pipeline corridor using the pipeline corridor structural graph, the potential correlations between different pieces of information in the messy and complex data can be effectively mined.

The responsivity determination model refers to a prediction model used to determine a risk responsivity. In some embodiments, the responsivity determination model may be a machine learning model, such as a graph neural networks (GNN) model.

In some embodiments, an input of the responsivity determination model may include the pipeline corridor structural graph, and an output of the responsivity determination model may include the risk responsivities corresponding to a portion of the storage location nodes in the pipeline corridor structural graph.

In some embodiments, the responsivity determination model may be obtained by training an initial responsivity determination model based on second training samples with second labels.

In some embodiments, the second training samples of the responsivity determination model may include actual pipeline corridor structural graphs collected at historical fault times. For example, the processor may collect pipeline corridor structural graphs when a fault occurs at a plurality of historical time points and determine the fault types corresponding to the pipeline corridor structural graphs using feedback from the maintenance personnel following historical maintenance operations. Fault samples may be grouped based on the fault types to obtain gas fault samples and non-gas fault samples (e.g., a flood fault sample, a corrosion fault sample, etc.). A certain number of non-gas fault samples may be randomly selected to be combined with the gas fault samples to form the second training samples.

In some embodiments, the gas fault samples may have the highest proportion in the second training samples, and the proportion of the gas fault samples in the second training sample may be greater than a preset proportion. The preset proportion may be determined based on the priori experience.

In some embodiments, the preset proportion may also be related to a distribution of pipelines within the gas pipeline corridor. For example, if there are many non-gas pipelines within the pipeline corridor, the preset proportion may be appropriately reduced to comprehensively consider the impact of other types of faults on the gas pipeline corridor.

In some embodiments, the second labels corresponding to the second training sample refer to actual risk responsivities corresponding to the storage location nodes in the actual pipeline corridor structural graphs at historical fault time.

In some embodiments, the actual risk responsivities may be determined based on the formula (1). More descriptions regarding the formula (1) may be found in FIG. 3 and related descriptions thereof.

In some embodiments, the processor may determine the actual risk responsivities based on accessibility of the storage locations, a path length, and the availability of emergency materials at the storage locations to resolve faults in case of the historical faults. For example, the processor may categorize whether the maintenance personnel go to the storage locations and resolve the faults into three scenarios. Scenario A: if the maintenance personnel cannot safely reach the storage locations due to flooding, fire, gas leakage, and other reasons, the risk responsivity may be categorized as a Class A responsivity. Scenario B: if the maintenance personnel can go to the storage locations, but the emergency materials at the storage locations cannot resolve the corresponding fault due to mismatch of types, the risk responsivity may be categorized as a Class B responsivity. Scenario C: if the maintenance personnel can go to the storage locations and the emergency materials at the storage locations can resolve the fault, the risk responsivity may be categorized as a Class C responsivity.

In some embodiments, the Class A responsivity and the Class B responsivity may be a preset value, respectively. The preset value may be based on the prior experience, such as 20 points for the Class A responsivity and 30 points for the Class B responsivity.

In some embodiments, the processor may determine the Class C responsivity based on the path distance by querying a responsivity preset table. The responsivity preset table may include a correspondence relationship between various path distances and the Class C responsivity.

In some embodiments, the Class C responsivity>the Class B responsivity>the Class A responsivity.

In some embodiments, the fault prediction model may be obtained by training based on the plurality of second training samples with the second labels. A training process of the responsivity determination model may be similar to that of the fault prediction model, which is described in FIG. 3 and related descriptions thereof.

In some embodiments of the present disclosure, by forming the second samples with the non-gas faults and the gas faults, factors related to the gas and other non-gas factors can be considered when the responsivity determination model predicts the risk responsivities, thereby ensuring the comprehensive sample coverage, and improving the accuracy of the predicted risk responsivities.

In some embodiments, the processor may determine, based on the historical fault data and the risk responsivities, a dynamic validity period of the dynamic location; and in response to determining that a preset adjustment condition is satisfied within a preset range of the dynamic locations during the dynamic validity period, determine the dynamic locations as the locations to be adjusted.

The dynamic validity period refers to an effective time range for storage of the emergency materials at the dynamic location. In some embodiments, if there is no fault event near the dynamic locations during the dynamic validity period, the emergency materials stored at the dynamic locations may be adjusted to other dynamic locations for storage. The dynamic validity period may be preset based on prior experience.

In some embodiments, the processor may construct a vector to be matched based on the historical fault data, the historical maintenance data, the historical risk source data, and the historical risk responsivities within the preset range. The processor may obtain reference vectors of which vector distances from the vector to be matched are less than a distance threshold by searching in a vector database based on the vectors to be matched. The vector database may be configured to store a correspondence relationship between a plurality of historical vectors and historical dynamic validity periods. The processor may determine historical dynamic validity periods corresponding to the reference vectors as current required dynamic validity periods. The historical dynamic validity periods may be obtained based on actual experience and historical data. The historical vectors may be constructed based on the historical fault data, the historical maintenance data, the historical risk source data, and the historical risk responsivities.

The preset range refers to a distance range of the gas pipeline corridor around the dynamic location. In some embodiments, when a fault situation occurs within the preset range, the dynamic locations may provide the related emergency materials timely and effectively. The preset range may be preset based on the priori experience.

The preset adjustment condition refers to a determination condition for determining adjustment to the materials. In some embodiments, the preset adjustment condition may include a condition 1 and a condition 2 as described below. The condition 1 may be that the risk responsivities of the storage locations are less than a risk responsivity threshold. The condition 2 may be that there is not fault within the preset range of the storage locations during the dynamic validity period. If any of the conditions 1 and 2 is met, it is determined that the preset adjustment condition is met.

In some embodiments of the present disclosure, if it is determined that the emergency materials at the dynamic locations do not serve the intended purpose within a certain time range, the dynamic locations may be determined as the locations to be adjusted to achieve efficient utilization of the emergency materials.

In some embodiments of the present disclosure, by determining the locations to be adjusted using the responsivity determination model, the potential information in the predicted fault data can be minted by utilizing the data processing capability and the data analysis capability of the mode, and the final locations to be adjusted can be determined, thereby achieving efficient utilization of the emergency materials, and avoiding the emergency materials piling up at underutilized storage locations.

Figure 5:
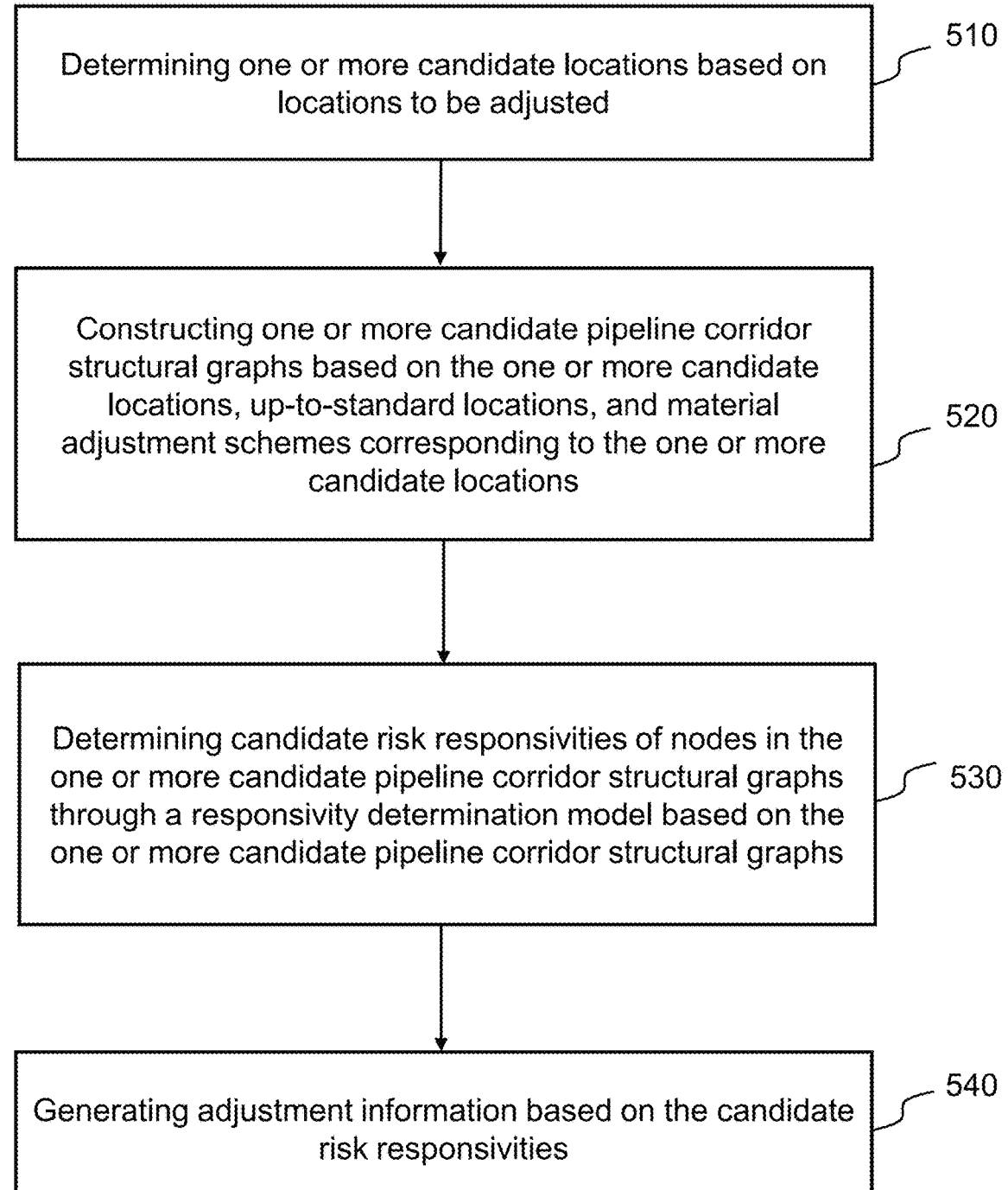
FIG. 5 is a flowchart illustrating an exemplary process of generating adjustment information according to some embodiments of the present disclosure.

FIG. 5 a flowchart illustrating an exemplary process of generating adjustment information according to some embodiments of the present disclosure.

In some embodiments, a process 500 may be performed by a smart gas company management platform. As shown in FIG. 5, the process 500 may include the following operations.

In 510, one or more candidate locations may be determined based on locations to be adjusted.

The one or more candidate locations refer to alternative storage locations.

In some embodiments, a smart gas company management platform may determine at least one candidate location based on the locations to be adjusted in a random generation mode. The random generation mode may be performed by randomly selecting, from the remaining preset storage locations after current storage locations are removed, the same number of locations as the number of the locations to be adjusted as candidate locations. The preset storage locations refer to locations in a pipeline corridor capable of storing materials. The locations to be adjusted may randomly transport the materials to the one or more candidate locations, so that one candidate location may correspond to at least one candidate material adjustment scheme.

For example, if numbers are used as identifiers of the storage locations, the preset storage locations are denoted as [1, 2, 3, 4, 5, 6, 7, 8], the current storage locations are denoted as [1, 2, 3, 4], and the locations to be adjusted are denoted as [3, 4], the one or more candidate locations may be any two of [5, 6, 7, 8]. Taking the candidate locations of [5, 6] as an example, the corresponding candidate material adjustment scheme may be [(3, 5), (4, 6)], i.e., the materials may be transported from a position 3 to a position 5, and from a position 4 to a position 6; or the corresponding candidate material adjustment scheme may be [(3, 6), (4, 5)], i.e., the materials may be transported from the position 3 to the position 6, and from the position 4 to the position 5.

In 520, one or more candidate pipeline corridor structural graphs may be constructed based on the one or more candidate locations, up-to-standard locations, and material adjustment schemes corresponding to the one or more candidate locations.

The up-to-standard locations refer to storage locations after the locations to be adjusted are removed, i.e., the storage locations that do not require adjustment.

The material adjustment schemes refer to plans or programs to arrange, adjust, or optimize materials. The material adjustment schemes may include locations of material adjustment and types and quantities of materials to be adjusted.

The one or more candidate pipeline corridor structural graphs refer to alternative pipeline corridor structural graphs. Nodes of the one or more candidate pipeline corridor structural graphs may include up-to-standard location node, candidate location nodes, predicted fault location nodes, and entrance/exit nodes. Other data in the one or more candidate pipeline corridor structural graph may be consistent with the pipeline corridor structural graphs. Descriptions regarding the other data in the one or more candidate pipeline corridor structural graphs may be found in the related descriptions of the one or more candidate pipeline corridor structural graphs in FIG. 4.

In some embodiments, the smart gas company management platform may construct the one or more candidate pipeline corridor structural graphs in various ways based on the one or more candidate locations, the up-to-standard locations, and the material adjustment schemes corresponding to the one or more candidate locations. For example, one or more candidate locations, the up-to-standard locations, and the material adjustment schemes corresponding to the one or more candidate locations may be manually marked on a gas pipeline corridor map. The smart gas company management platform may automatically generate the one or more candidate pipeline corridor structural graphs using an image reconstruction technology.

In 530, candidate risk responsivities of nodes in the one or more candidate pipeline corridor structural graphs may be determined through a responsivity determination model based on the one or more candidate pipeline corridor structural graphs.

The candidate risk responsivities refer to risk responsivities corresponding to the nodes in the one or more candidate pipeline corridor structural graphs.

In some embodiments, the smart gas company management platform may input the one or more candidate pipeline corridor structural graphs into the responsivity determination model, and the responsivity determination model may output the candidate risk responsivities of the nodes in the one or more candidate pipeline corridor structural graphs. More descriptions regarding determining the risk responsivities through the responsivity determination model may be found in the related descriptions of FIG. 4.

In 540, adjustment information may be generated based on the candidate risk responsivities.

In some embodiments, the smart gas company management platform may generate the adjustment information by comparing the candidate risk responsivities with responsivity threshold. For example, after the one or more candidate pipeline corridor structural graphs are input into the responsivity determination model, if the output risk responsivities of the one or more candidate locations are all greater than the responsivity threshold, the material adjustment schemes corresponding to that one or more candidate locations in the one or more candidate pipeline corridor structural graphs may be determined as the adjustment information.

Alternatively, the one or more candidate pipeline corridor structural graphs may be constructed using a next material adjustment scheme corresponding to the one or more candidate locations, and calculation may be performed again until the output risk responsivities corresponding to the one or more candidate locations are all greater than the responsivity threshold, or the material adjustment schemes corresponding to the one or more candidate locations are all used up.

If the material adjustment schemes corresponding to the one or more candidate locations are all used up, the above operation may be repeated using a next candidate location. If all the candidate locations are used up, and the risk responsivities corresponding to the storage locations being greater than the responsivity threshold is not met, a material adjustment scheme with a largest average risk responsivity may be determined as the adjustment information.

As can be seen from the foregoing, in some embodiments of the present disclosure, the smart gas company management platform may generate the adjustment information more intelligently by comparing the candidate risk responsivities with the responsivity threshold. In this process, iterative calculation may be performed on the one or more candidate pipeline corridor structural graph, and only when the output risk responsivities of the one or more candidate locations satisfies the preset condition, the material adjustment scheme corresponding to the one or more candidate locations may be determined as the adjustment information. The iterative approach may reduce the number of candidate locations and material adjustment schemes that do not meet the requirements, and improve the accuracy and practicality of the adjustment information. If the requirements are not met, the material adjustment scheme with a relatively large average risk responsivity may be determined as the adjustment information, thereby further improving the overall security and level of risk management.

In some embodiments, the one or more candidate locations and the material adjustment schemes may also be generated based on the up-to-standard locations, the locations to be adjusted, and material information of the storage locations.

Description regarding the material information may be found in the related description of FIG. 2.

In some embodiments, the smart gas company management platform may determine the one or more candidate locations and the material adjustment schemes based on the up-to-standard locations, the locations to be adjusted, and the material information of the storage locations through vector search.

One or more candidate feature vector databases may be constructed using historical adjustment data. The one or more candidate feature vector databases may include a plurality of reference candidate feature vectors. The historical adjustment data may include pipeline corridor monitoring data prior to each adjustment, the up-to-standard locations and corresponding material storage situations, the locations to be adjusted and the corresponding material storage situations, and actual material adjustment schemes after the adjustment.

One or more candidate feature vectors may be constructed based on the current pipeline corridor monitoring data, the up-to-standard locations and the corresponding material storage situations, and the locations to be adjusted and the corresponding material storage situations. A similarity threshold of the one or more candidate feature vectors may be preset.

Similarities between current candidate feature vectors and the plurality of reference candidate feature vectors may be compared based on the one or more candidate feature vector databases. Reference candidate feature vectors of which the similarities are greater than the similarity threshold may be selected. Reference material adjustment schemes corresponding to the reference candidate feature vectors may be determined as the material adjustment schemes, thereby determining at least one material adjustment scheme.

The processor may use the locations to be adjusted of the materials corresponding to the at least one material adjustment scheme as the one or more candidate locations.

The one or more candidate pipeline corridor structural graphs may be constructed based on the at least one material adjustment scheme and corresponding candidate locations, and the one or more candidate pipeline corridor structural graphs may be input into the responsivity determination model to calculate the candidate risk responsivities of each storage location in the one or more candidate pipeline corridor structural graphs. Description regarding constructing the one or more candidate pipeline corridor structural graphs and calculating the risk responsivities may be found in the related descriptions of the operation 520.

If the candidate risk responsivities corresponding to the one or more candidate locations are greater than the responsivity threshold, the material adjustment schemes corresponding to the one or more candidate locations in the candidate pipeline corridor structural graphs may be determined as the adjustment information. Alternatively, the material adjustment scheme corresponding to the at least one candidate location may be determined in the random generation mode based on the locations to be adjusted. Negative schemes (schemes that are not determined as the material adjustment schemes) may be removed from the randomly generated candidate locations and the material adjustment schemes after searching in the one or more candidate feature vector database.

Descriptions regarding determining the at least one candidate location in the random generation mode based on the locations to be adjusted may be found in the embodiment of the operation 510.

As can be seen from the foregoing, some embodiments of the present disclosure construct the one or more candidate feature vector database using the historical adjustment data, and seek similar material adjustment schemes based on the current situation through vector search, to avoid complicated calculation of random generation for each adjustment, which effectively reduces the calculation time and enhances the efficiency of the algorithm, thereby optimizing the overall management effect of the pipeline corridor.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An Internet of Things (IoT) system connecting to management and control of pipeline corridor emergency materials based on smart gas supervision, a smart gas company management platform, a gas equipment object platform, and a government gas supervision management platform, an environmental adjustment device and a material transportation device, and the gas equipment object platform is configured as a pipeline corridor monitoring device and a gas monitoring device, the Internet of Things (IoT) system executed by a computer, comprising a processor and memory, the computer configured to:

obtain, based on a data storage center, at least one of operation and maintenance data, geographic information, and operation filing data of a pipeline corridor, the operation filing data including storage locations of the pipeline corridor emergency materials;

obtain pipeline corridor monitoring data and gas monitoring data of the pipeline corridor through the gas equipment object platform;

obtain population data and other pipeline data through the government gas supervision management platform;

assess, based on at least one of the operation and maintenance data, the geographic information, the operation filing data, the pipeline corridor monitoring data, and the gas monitoring data, risk responsivities of different storage locations;

determine, based on the risk responsivities and the population data, adjustment information of the storage locations;

send the adjustment information to the government gas supervision management platform, and in response to determining that the government gas supervision management platform determines to perform adjustment of the storage locations, adjust, based on the adjustment information, parameters of the environmental adjustment device;

deploy within the pipeline corridor and configured to obtain the pipeline corridor monitoring data within the pipeline corridor and upload the pipeline corridor monitoring data to a gas company sensor network platform through the gas equipment object platform, the pipeline corridor monitoring device including a temperature sensor, an air sensor, and a surveillance camera device;

deploy within a gas pipeline and configured to obtain the gas monitoring data within the gas pipeline and upload the gas monitoring data to the gas company sensor network platform through the gas equipment object platform, the gas monitoring device including a flow rate monitoring device, a temperature sensor, and a pressure sensor;

perform material transportation within the pipeline corridor based on a transportation instruction by the material transportation device;

deploy within the pipeline corridor and configured to control environmental parameters within the pipeline corridor, the environmental adjustment device including a fan and a dehumidification device;

in response to determining that the adjustment information is obtained from the smart gas company management platform, determine the transportation instruction based on the adjustment information;

control, based on the transportation instruction, the material transportation device to transport the materials within the pipeline corridor, the transportation instruction including a transportation route;

in response to the material transportation device being controlled, complete material transportation, upload a current material storage situation to the government gas supervision management platform through the smart gas company management platform; and automatically remove, by the material transportation device, the automatically removed materials from the current location to the adjustment of the storage locations based on risk responsivities of different storage locations.

2. The IoT system of claim 1, wherein the storage locations include static location and dynamic locations, and the smart gas company management platform is further configured to:

obtain, based on the operation and maintenance data, at least one of historical fault data, historical risk sources, and maintenance update data;

determine, based on at least one of the historical fault data, the historical risk sources, the maintenance update data, the geographic information, the operation filing data, the pipeline corridor monitoring data, and the gas monitoring data, predicted fault data of the pipeline corridor at a future time through a fault prediction model; the fault prediction model being a machine learning model;

determine, based on the predicted fault data and the storage locations, the risk responsivities;

determine a risk responsivity threshold based on the population data; and determine, based on at least one of the risk responsivities, the risk responsivity threshold, and location types of the storage locations, locations to be adjusted.

3. The IoT system of claim 2, wherein an input of the fault prediction model includes historical storage data.

4. The IoT system of claim 2, wherein the smart gas company management platform is further configured to:

construct, based on the predicted fault data, the storage locations, and materiel information of the storage locations, a pipeline corridor structural graph; nodes of the pipeline corridor structural graph including storage location nodes; and determine, based on the pipeline corridor structural graph, risk responsivities of the storage location nodes through a responsivity determination model; the responsivity determination model being a machine learning model.

5. The IoT system of claim 4, wherein the nodes of the pipeline corridor structural graph further include a predicted fault location node, and an entrance/exit node; and node attributes of the storage location nodes include a node type, and the materiel information, and node attributes of the predicted fault location node include a fault type and a fault time;

edges of the pipeline corridor structural graph include pipeline corridors between the nodes; and edge attributes of the edges include at least one of the operation and maintenance data, pipeline distribution data, a length, a width, and the pipeline corridor monitoring data.

6. The IoT system of claim 4, wherein the responsivity determination model is obtained by training an initial responsivity determination model based on labeled training samples;

the training samples of the responsivity determination model include a sample pipeline corridor structural graph, the sample pipeline corridor structural graph includes an actual pipeline corridor structural graph collected at a historical fault time; and labels corresponding to the training samples include actual risk responsivities corresponding to the storage location nodes in the actual pipeline corridor structural graph at the historical fault time.

7. The IoT system of claim 4, wherein the smart gas company management platform is further configured to:

determine one or more candidate locations based on the locations to be adjusted;

construct, based on the one or more candidate locations, up-to-standard locations, and material adjustment schemes corresponding to the one or more candidate locations, one or more candidate pipeline corridor structural graphs;

determine, based on the one or more candidate pipeline corridor structural graphs, candidate risk responsivities of nodes in the one or more candidate pipeline corridor structural graphs through the responsivity determination model; and generate the adjustment information based on the candidate risk responsivities.

8. The IoT system of claim 7, wherein the one or more candidate locations and the material adjustment schemes corresponding to the one or more candidate locations are generated based on the up-to-standard locations, the locations to be adjusted, and the materiel information.

9. The IoT system of claim 2, wherein the smart gas company management platform is further configured to:

determine, based on the historical fault data and the risk responsivities, a dynamic validity period of the dynamic locations; and in response to determining that a preset adjustment condition is satisfied within a preset range of the dynamic locations during the dynamic validity period, determine the dynamic locations as the locations to be adjusted.

10. A method of an Internet of Things (IoT) system connecting to management and control of pipeline corridor emergency materials based on smart gas supervision, a smart gas company management platform, a gas equipment object platform, and a government gas supervision management platform, an environmental adjustment device and a material transportation device, and the gas equipment object platform is configured as a pipeline corridor monitoring device and a gas monitoring device, the method executed by a computer, comprising a processor and memory, the computer configured to:

obtain, based on a data storage center, at least one of operation and maintenance data, geographic information, and operation filing data of a pipeline corridor, the operation filing data including storage locations of the pipeline corridor emergency materials;

obtain pipeline corridor monitoring data and gas monitoring data of the pipeline corridor through the gas equipment object platform;

obtain population data and other pipeline data through the government gas supervision management platform;

assess, based on at least one of the operation and maintenance data, the geographic information, the operation filing data, the pipeline corridor monitoring data, and the gas monitoring data, risk responsivities of different storage locations;

determining, based on the risk responsivities and the population data, adjustment information of the storage locations;

send the adjustment information to the government gas supervision management platform, and in response to determining that the government gas supervision management platform determines to perform adjustment of the storage locations, causing the smart gas company management platform to adjust, based on the adjustment information, parameters of the environmental adjustment device;

deploy within the pipeline corridor and configured to obtain the pipeline corridor monitoring data within the pipeline corridor and upload the pipeline corridor monitoring data to a gas company sensor network platform through the gas equipment object platform, the pipeline corridor monitoring device including a temperature sensor, an air sensor, and a surveillance camera device;

deploy within a gas pipeline and configured to obtain the gas monitoring data within the gas pipeline and upload the gas monitoring data to the gas company sensor network platform through the gas equipment object platform, the gas monitoring device including a flow rate monitoring device, a temperature sensor, and a pressure sensor;

perform material transportation within the pipeline corridor based on a transportation instruction by the material transportation device;

deploy within the pipeline corridor and configured to control environmental parameters within the pipeline corridor, the environmental adjustment device including a fan and a dehumidification device;

in response to determining that the adjustment information is obtained from the smart gas company management platform, determine the transportation instruction based on the adjustment information;

control, based on the transportation instruction, the material transportation device to transport the materials within the pipeline corridor, the transportation instruction including a transportation route;

in response to the material transportation device being controlled, complete material transportation, upload a current material storage situation to the government gas supervision management platform through the smart gas company management platform; and automatically remove, by the material transportation device, the automatically removed materials from the current location to the adjustment of the storage locations based on risk responsivies of different storage locations.

11. The method of claim 10, wherein the storage locations include static locations and dynamic locations, and the method further comprises:

obtaining, based on the operation and maintenance data, at least one of historical fault data, historical risk sources, and maintenance update data;

determining, based on at least one of the historical fault data, the historical risk sources, the maintenance update data, the geographic information, the operation filing data, the pipeline corridor monitoring data, and the gas monitoring data, predicted fault data of the pipeline corridor at a future time through a fault prediction model; the fault prediction model being a machine learning model;

determining, based on the predicted fault data and the storage locations, the risk responsivies;

determining a risk responsivity threshold based on the population data; and determining, based on at least one of the risk responsivies, the risk responsivity threshold, and location types of the storage locations, locations to be adjusted.

12. The method of claim 11, wherein an input of the fault prediction model includes historical storage data.

13. The method of claim 11, wherein the determining, based on the predicted fault data and the storage locations, the risk responsivies includes:

constructing, based on the predicted fault data, the storage locations, and materiel information of the storage locations, a pipeline corridor structural graph; nodes of the pipeline corridor structural graph including storage location nodes; and determining, based on the pipeline corridor structural graph, risk responsivies of the storage location nodes through a responsivity determination model; the responsivity determination model being a machine learning model.

14. The method of claim 13, wherein the nodes of the pipeline corridor structural graph further include a predicted fault location node, and an entrance/exit node; and node attributes of the storage location nodes include a node type, and the materiel information, and node attributes of the predicted fault location node include a fault type and a fault time;

edges of the pipeline corridor structural graph include pipeline corridors between the nodes; and edge attributes of the edges include at least one of the operation and maintenance data, pipeline distribution data, a length, a width, and the pipeline corridor monitoring data.

15. The method of claim 13, wherein the responsivity determination model is obtained by training an initial responsivity determination model based on labeled training samples;

the training samples of the responsivity determination model include sample pipeline corridor structural graphs, the sample pipeline corridor structural graphs include actual pipeline corridor structural graphs collected at historical fault times; and labels corresponding to the training samples include actual risk responsivies corresponding to the storage location nodes in the actual pipeline corridor structural graphs at the historical fault times.

16. The method of claim 13, further comprising:

determining one or more candidate locations based on the locations to be adjusted;

constructing, based on the one or more candidate locations, up-to-standard locations, and material adjustment schemes corresponding to the one or more candidate locations, one or more candidate pipeline corridor structural graphs;

determining, based on the one or more candidate pipeline corridor structural graphs, candidate risk responsivies of nodes in the one or more candidate pipeline corridor structural graphs through the responsivity determination model; and generating the adjustment information based on the candidate risk responsivies.

17. The method of claim 16, wherein the one or more candidate locations and the material adjustment schemes corresponding to the one or more candidate locations are generated based on the up-to-standard locations, the locations to be adjusted, and the materiel information.

18. The method of claim 11, wherein the determining, based on at least one of the risk responsivies, the risk responsivity threshold, and location types of the storage locations, locations to be adjusted includes:

determining, based on the historical fault data and the risk responsivies, a dynamic validity period of the dynamic locations; and in response to determining that a preset adjustment condition is satisfied within a preset range of the dynamic locations during the dynamic validity period, determining the dynamic locations as the locations to be adjusted.

19. A non-transitory computer-readable storage medium comprising computer instructions that, when executed by a computer, direct the computer to implement a method of an Internet of Things (IoT) system connecting to management and control of pipeline corridor emergency materials based on smart gas supervision, a smart gas company management platform, a gas equipment object platform, and a government gas supervision management platform, an environmental adjustment device and a material transportation device, and the gas equipment object platform is configured as a pipeline corridor monitoring device and a gas monitoring device, the method comprising:

obtaining, based on a data storage center, at least one of operation and maintenance data, geographic information, and operation filing data of a pipeline corridor, the operation filing data including storage locations of the pipeline corridor emergency materials;

obtaining pipeline corridor monitoring data and gas monitoring data of the pipeline corridor through a gas equipment object platform;

obtaining population data and other pipeline data through a government gas supervision management platform;

assessing, based on at least one of the operation and maintenance data, the geographic information, the operation filing data, the pipeline corridor monitoring data, and the gas monitoring data, risk responsivities of different storage locations;

determining, based on the risk responsivities and the population data, adjustment information of the storage locations;

sending the adjustment information to the government gas supervision management platform, and in response to determining that the government gas supervision management platform determines to perform adjustment of the storage locations, causing a smart gas company management platform to adjust, based on the adjustment information, parameters of an environmental adjustment device;

deploying within the pipeline corridor and configured to obtain the pipeline corridor monitoring data within the pipeline corridor and upload the pipeline corridor monitoring data to a gas company sensor network platform through the gas equipment object platform, the pipeline corridor monitoring device including a temperature sensor, an air sensor, and a surveillance camera device;

deploying within a gas pipeline and configured to obtain the gas monitoring data within the gas pipeline and upload the gas monitoring data to the gas company sensor network platform through the gas equipment object platform, the gas monitoring device including a flow rate monitoring device, a temperature sensor, and a pressure sensor;

performing material transportation within the pipeline corridor based on a transportation instruction by the material transportation device;

deploying within the pipeline corridor and configured to control environmental parameters within the pipeline corridor, the environmental adjustment device including a fan and a dehumidification device;

in response to determining that the adjustment information is obtained from the smart gas company management platform, determine the transportation instruction based on the adjustment information;

controlling, based on the transportation instruction, the material transportation device to transport the materials within the pipeline corridor, the transportation instruction including a transportation route;

in response to the material transportation device being controlled, complete material transportation, upload a current material storage situation to the government gas supervision management platform through the smart gas company management platform; and automatically removing, by the material transportation device, the automatically removed materials from the current location to the adjustment of the storage locations based on risk responsivities of different storage locations.

* * * * *